United States Patent [19]

Siviero

[11] Patent Number: 6,060,985
[45] Date of Patent: May 9, 2000

[54] MOTORCYCLE INSTRUMENT PANEL EASILY POSITIONED ON THE VEHICLE

[75] Inventor: Gianluca Siviero, Valduggia, Italy

[73] Assignee: Caviga Motors S.p.A., Varese, Italy

[21] Appl. No.: 09/009,677

[22] Filed: Jan. 21, 1998

[30] Foreign Application Priority Data

Feb. 7, 1997 [IT] Italy .................................. MI97A0253

[51] Int. Cl.[7] ..................................................... G09F 9/00
[52] U.S. Cl. ......................... 340/461; 340/432; 340/438; 345/7
[58] Field of Search .................................. 340/461, 432, 340/441, 459, 980, 438, 425.5, 427; 345/7, 87

[56] References Cited

U.S. PATENT DOCUMENTS

| | | | |
|---|---|---|---|
| 4,376,934 | 3/1983 | Prohaska et al. ....................... | 340/461 |
| 4,636,782 | 1/1987 | Nakamura et al. ..................... | 340/461 |
| 4,687,072 | 8/1987 | Komuro ..................................... | 345/7 |
| 4,862,395 | 8/1989 | Fey et al. ................................ | 340/432 |
| 4,954,807 | 9/1990 | Fleischer et al. ....................... | 340/459 |
| 5,043,727 | 8/1991 | Ito ............................................. | 340/438 |
| 5,691,695 | 11/1997 | Lahiff ...................................... | 340/459 |
| 5,757,268 | 5/1998 | Toffolo et al. .......................... | 340/459 |
| 5,821,867 | 10/1998 | Angell et al. ........................... | 340/461 |
| 5,880,710 | 3/1999 | Jaberi et al. ............................ | 340/461 |

OTHER PUBLICATIONS

Rayhem Publication "Electronics OEM Components—NCAP Polymer Displays", pp. 1–15.

*Primary Examiner*—Brent Swarthout
*Attorney, Agent, or Firm*—Steinberg & Raskin, P.C.

[57] ABSTRACT

A motorcycle instrument panel comprises a plurality of displays (4–15) for enabling the driver to check, for example, his speed (4), the activation state of one or more vehicle services such as lighting devices (8), direction indicators (9) and the like, and values relating to engine operation, such as its r.p.m., or its contained liquids, such as their temperature and level, said displays being connected to measurement and processing means (21) for the quantities to be displayed. The instrument panel comprises flexible circuit means enabling at least a part of the displays present on said instrument panel to be activated and operated.

1 Claim, 1 Drawing Sheet

MOTORCYCLE INSTRUMENT PANEL EASILY POSITIONED ON THE VEHICLE

FIELD OF THE INVENTION

This invention relates to a motorcycle instrument panel in accordance with the introduction to the main claim.

BACKGROUND OF THE INVENTION

The instrument panel of a motorcycle or of a two or three-wheeled or similar vehicle in general is known to comprise one or more instruments or displays able to provide the user (the vehicle driver) with a set of information ranging from the mere calculation of the vehicle speed with consequent indication of the distance travelled, to more complex functions such as those processed by the trip computer (ie the on-board computer which indicates for example the distance travelled since the last fuel filling, the distance remaining, etc.) and/or specific measurements such as the operating temperature, the engine r.p.m., etc.

If the instrument panel comprises one or more individual instruments, these are usually constructed with traditional mechanical components with accuracy levels which are not always acceptable and are sometimes very low. Such components usually occupy a considerable space and are hence very bulky, this influencing the instrument panel dimensioning. It is often difficult to position it in the front region of the motorcycle, a region which is usually already of critical dimensions. Moreover such instruments are very fragile.

The advent of digital technology and liquid crystals have brought certain improvements in measurement precision and in size reduction, but have led to other limitations such as an increase in fragility, limits on operability with varying temperature, limitations due to low graphics power (the crystals being monochromatic) and a considerable reduction in contrast as the external light level increases. Consequently, even the use of this technology in instrument panel construction has not given the desired results. Such technology has hence not had widespread use.

OBJECTS AND SUMMARY OF THE INVENTION

An object of the invention is to provide an improved instrument panel for two or three-wheeled vehicles.

A particular object of the invention is to provide an instrument panel of the stated type which offers high flexibility from the graphics aspect, which allows a wide range of different quantities useful in vehicle operation to be displayed, which is easily readable under any environmental light condition and is mechanically very strong.

A further object is to provide an instrument panel of the stated type which can be positioned at any point of the motorcycle, whether on flat or concave or convex curved parts, without this positioning affecting its functioning and operability.

A further object is to provide an instrument panel which is impermeable and can be positioned on the vehicle separately from the means for measuring and processing the quantities to be displayed, these being able to be positioned at points on the vehicle which are different from that at which the instrument panel is positioned, based on the availability offered by the motorcycle structure.

A further object is to provide an instrument panel of the stated type enabling all possible information to be displayed which is useful in informing the driver of every phenomenon occurring on his vehicle so that he can react in consequence.

A further object is to provide an instrument panel which can be used to successively display different pieces of information useful to the driver, or an instrument panel which can be used as the visual display unit for the computer on board the vehicle.

These and further objects which will be apparent to an expert of the art are attained by an instrument panel in accordance with the accompanying claims.

BRIEF DESCRIPTION OF THE DRAWINGS

The invention will be more apparent from the accompanying drawing, which is provided by way of non-limiting example and on which.

DETAILED DESCRIPTION OF THE PREFERRED EMBODIMENTS

Figure 1:
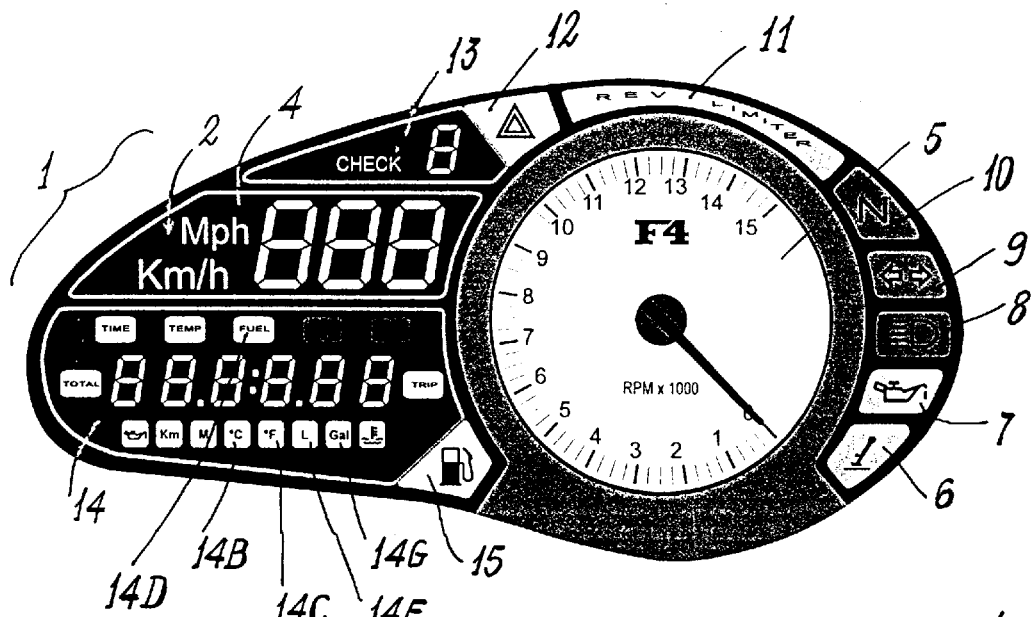
FIG. 1 is a front view of the instrument panel of the invention.
Figure 2:
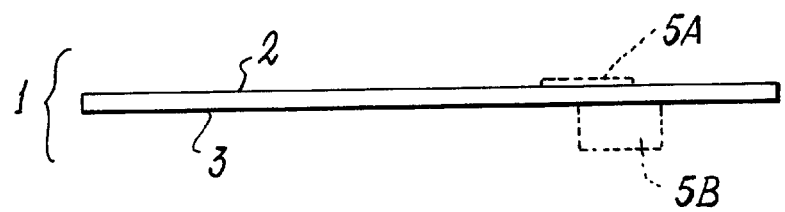
FIG. 2 is a side view of the instrument panel of FIG. 1.

With reference to said figures, the instrument panel of the invention comprises a casing 1 provided with an upper surface or face 2 and a lower surface or face 3. Displays 4 to 15 are provided on the face 2 and are described hereinafter. The face 3 is placed on a support surface provided on a motorcycle, to which it is fixed in known manner, for example by gluing or by usual fixing means (such as screws). The casing 1 comprises one or more flexible circuits of the same dimensions (length and width) as the instrument panel, a flexible circuit being a printed circuit formed on a sheet of plastic material. This circuit cooperates with a liquid crystal emulsion spread over it and on which there is positioned a luminous coloured fluorescent reflector which, in the invention, defines the face 2 of the instrument panel. These circuits, in association with said emulsion and reflector are widely used in control and display panels for machine tools, automatic distributors and the like. In these cases the liquid crystal emulsion is preferable contained between two very thin, transparent conductive substrates carrying the printed circuits. The reflector is positioned on the outer substrate.

Such flexible circuits for forming panels and displays have never before been used in the motorcycle field. In the light of the aforesaid problems of known instrument panels related in particular to the space occupied by them, to their reliability and to the imperfect display of the data required for driving the vehicle, it has been discovered that the use of such circuits in combination with the aforesaid emulsion and reflector enable an instrument panel of very small thickness to be obtained, which can be positioned anywhere on the motorcycle separate from the measurement and data processing devices relative to the operation and use of the motorcycle, and which is highly reliable and can be formed in a variety of shapes, dimensions and colors never previously achieved.

During use, on powering the printed circuit or circuits a predetermined alignment of the liquid crystal molecules is obtained, enabling the light to pass through the conductive substrate or substrates on which said circuit or circuits are formed. The light reaches the reflector (having very low absorption), which is hence illuminated to provided the desired display. When the circuit or circuits are not powered (motorcycle engine at rest), the reflector reflects ambient light and hence appears dark.

The actual displays are present on the reflector. These displays comprise: a tachometer 4 with data in km/h or m.p.h., selectable by the vehicle driver; an r.p.m. indicator 5 which can be analog or digital. If analog, a usual pointer 5A is positioned on the dial and is driven by an electric motor 5B positioned on the lower face 3 of the casing 1; an indicator 6 indicating the position (retracted or extended) of the usual vehicle support element; an engine oil deficiency display 7; a headlight activation display 8; a position indicator activation display 9; an engine idling indicator 10; a display 12 for indicating that all direction indicators are in the hazard position; a display 13 for the state of operation of the engine and its related parts (for example the starter system); a plurality of displays 14 comprising an eight-segment display 14A usable as a clock, an indicator for the total distance travelled, the partial distance travelled after zeroing (in km or miles), the cooling water temperature (indicated in ° C. or ° F. selectable by the user and indicated by the displays 14B and 14C), the fuel quantity (indicated by the displays 14D, 14F and 14G in litres or gallons selectable by the user), and other values (oil pressure, oil temperature, etc.) useful for knowing the engine operating state; and a fuel reserve display 15.

Figure 3:
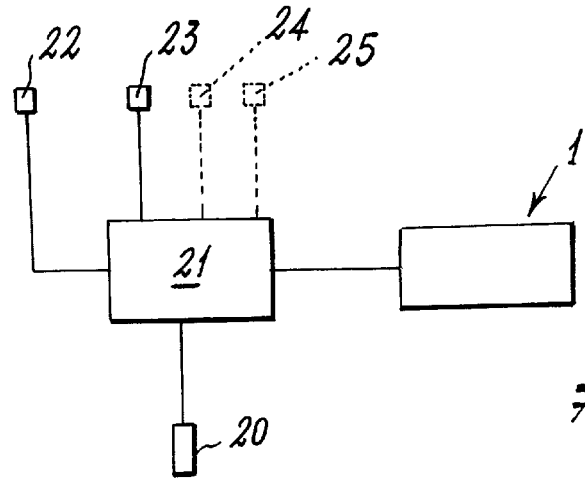
FIG. 3 is a block diagram of the instrument panel and of the parts for measuring the quantities and values displayed on it.

The display group 14 can also be used as a display for the on-board computer, which is activated by pressing a pushbutton used for starting the vehicle motor and which remains unused during vehicle running. This pushbutton, indicated by 20 in FIG. 3, is connected to processing means 21 (preferably a microprocessor circuit) connected to the various r.p.m., speed, fuel level and other sensors (indicated by the reference numerals 22–25 in FIG. 3) provided on the vehicle for measuring the quantities to be displayed on-the instrument panel. This latter is connected to the processing means 21 by which it is controlled for displaying that information useful to the driver for knowing the state of operation of the vehicle and its components.

The processing means 21 can also be positioned at a distance from the instrument panel, which can hence be mounted on the vehicle in any position chosen on the basis of ease of application (for example on the tank or on the front dome), ease of utilization and the resultant appearance of the vehicle. Consequently the position of the instrument panel on the motorcycle can be chosen totally at will on the basis of requirements and necessity (for example if there is insufficient space in that part close to the steering tube, the instrument panel can be positioned on the tank).

The instrument panel of the invention allows the designer considerable flexibility from the graphics aspect, enabling him to create and blend all forms of display, from the classic to the modern and/or the extravagant, and with the facility for using different colors within the framework of the same crystal; this flexibility also extends to the mechanical aspect in that, as stated, the instrument panel can also be positioned on concave or convex surfaces of single curvature without altering its operability. It is also infrangible and impermeable, enabling it to be also used separately from the control electronics, hence facilitating its installation. It is also of very small thickness, preferably between 1 and 5 mm.

In contrast to liquid crystal instrument panels, the panel contrast increases as the external brightness increases.

The facility for grouping together, on a single surface, all the display forms, i.e. warning lights, r.p.m. indicator, total and partial distance indicator, level indicators, clock and chronometer (for use in racing), temperature indicators and any other required instruments, leaves open the possibility of giving the motorcycle driver as much information as required to inform him of everything happening on his vehicle to enable him to react in consequence. To avoid filling the instrument panel with too much information and instead present a little but very visible information at a time, a multi-function panel can be inserted into the instrument panel and arranged to display all the aforelisted items of information but one at a time. To obtain this, as stated, a pushbutton is used which has already been used to start the engine but which during normal running remains unused. This pushbutton is substantially deactivated by the means 21 with regard to its starting function and can be used only for the aforesaid purpose. By operating said pushbutton the instrument panel can also be set for the desired measurement units (km or miles, ° C. or ° F., litres or gallons, etc.) or set for use in racing by giving the driver only the necessary information and the time for the lap which has just been completed.

I claim:

1. A motorcycle instrument panel including a plurality of displays for enabling a driver to check his speed, an activation state of at least one of plurality of vehicle services including lighting devices, direction indicators, values relating to either engine operation including r.p.m. or its contained liquids including temperature and level, said displays being connected to measurement and processing means for quantities to be displayed; comprising:

said instrument panel includes a flexible circuit means enabling at least a part of said displays to be activated and operated, said flexible circuit means including a printed circuit board formed on a sheet of plastic material, said printed circuit board having a liquid crystal emulsion spread thereover, and a luminous fluorescent reflector panel positioned on said liquid crystal emulsion covered printed circuit board to define a face of said instrument panel.

* * * * *